Figure 3:
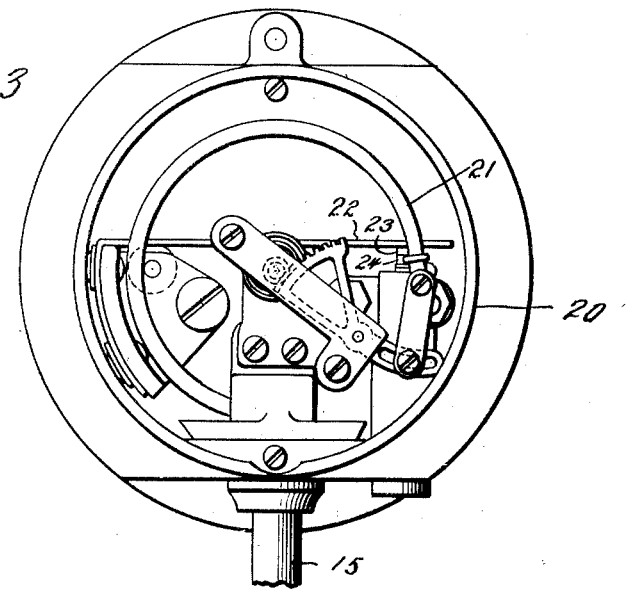

Feb. 9, 1932. J. C. HEINTZ 1,844,505
APPARATUS FOR VULCANIZING REPAIRS IN RUBBER TIRES
Filed Oct. 10, 1928 4 Sheets-Sheet 1
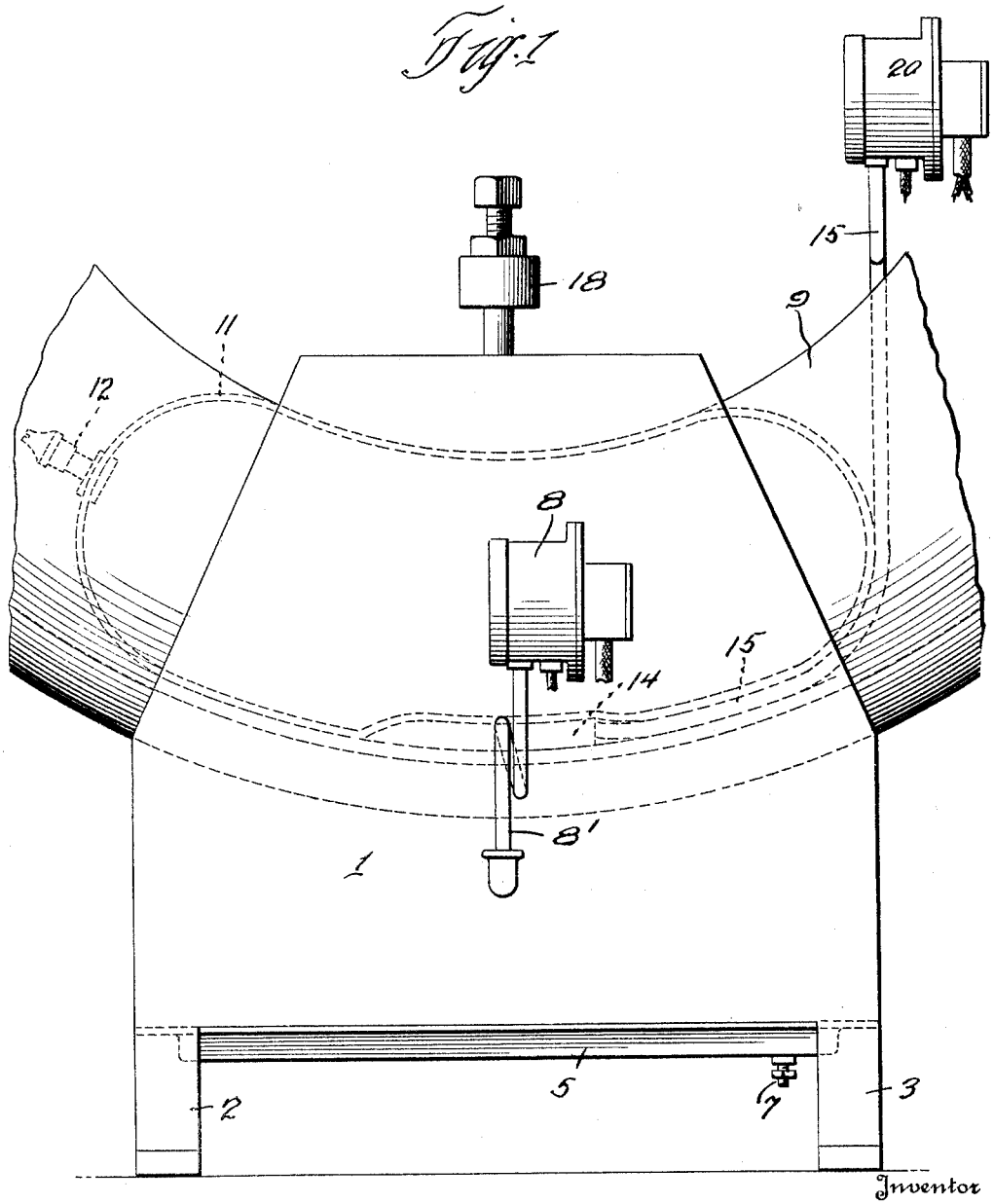

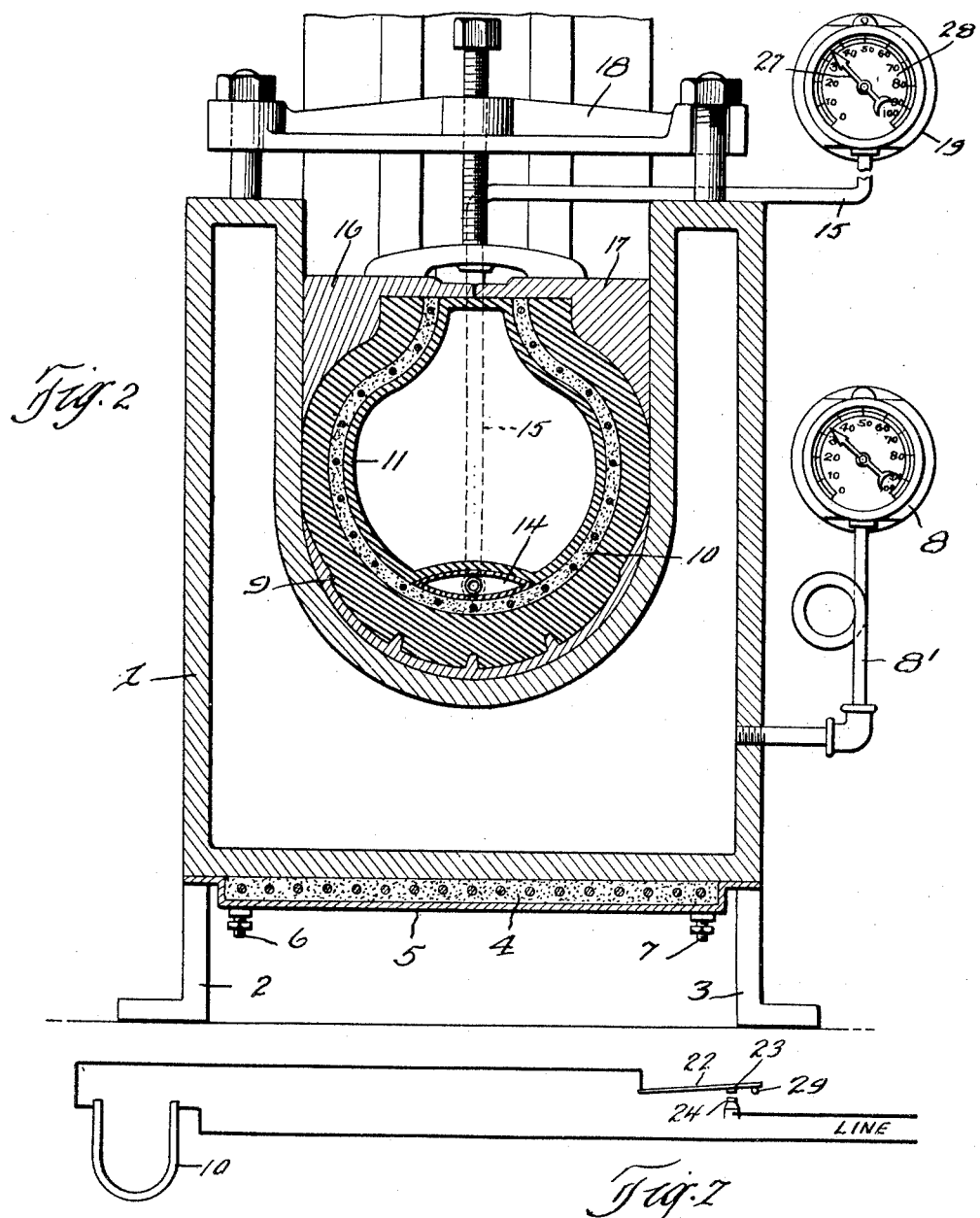
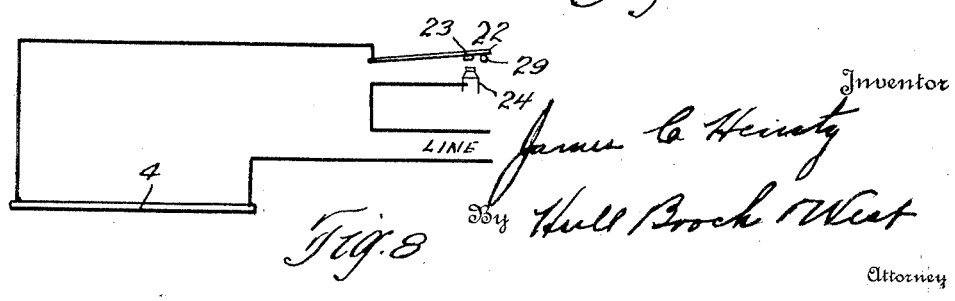

Feb. 9, 1932. J. C. HEINTZ 1,844,505
APPARATUS FOR VULCANIZING REPAIRS IN RUBBER TIRES
Filed Oct. 10, 1928 4 Sheets-Sheet 3

Inventor
James C. Heintz
By Hull Brock & West
Attorney

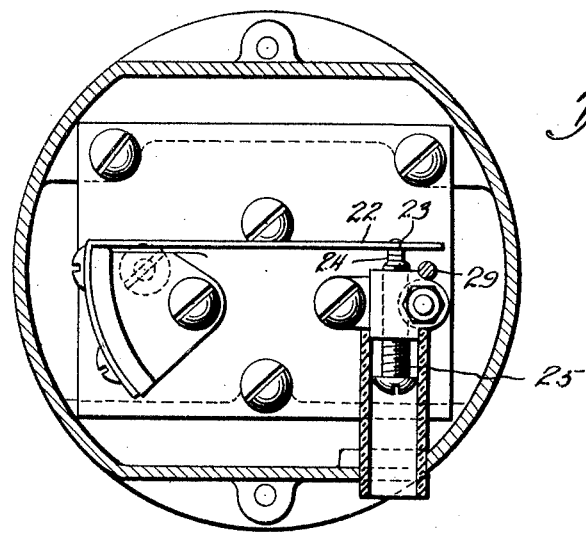
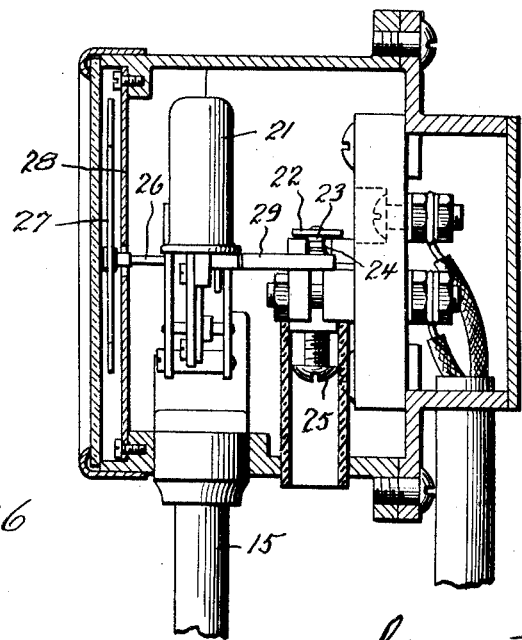

Patented Feb. 9, 1932

1,844,505

UNITED STATES PATENT OFFICE

JAMES C. HEINTZ, OF LAKEWOOD, OHIO

APPARATUS FOR VULCANIZING REPAIRS IN RUBBER TIRES

Application filed October 10, 1928. Serial No. 311,475.

This invention relates generally to a vulcanizing apparatus which is particularly adapted for use in vulcanizing repairs in pneumatic tires.

The main object of the invention is to provide a simple, accurate and dependable apparatus for vulcanizing repairs in tire casings wherein the heat required for vulcanizing is supplied to the repair from both the inside and outside of the tire simultaneously in predetermined and controlled quantities and in which a sufficient pressure is applied to the repair during the entire process of vulcanization so as to insure a proper welding together of the various parts of the repair.

A further object of the invention is to provide a method of vulcanizing repairs in pneumatic tires which consists in substantially surrounding the repair with a mold, heating both the interior and the exterior of the repair to a vulcanizing temperature, subjecting the repair to a vulcanizing pressure and maintaining such temperature and pressure substantially constant and sufficiently high as to cause a vulcanization and welding together of the various parts of the repair.

A still further object of the invention is to provide a method and apparatus for vulcanizing repairs in tire casings in which both the interior and the exterior of the repair are heated by means of an electrical resistance and in which the temperature and pressure is maintained substantially constant by means of a Bourdon tube and switch which automatically breaks the circuit to the heating element when the temperature reaches a predetermined point.

While the method and principle herein described may be used in repairing any pneumatic tire casing, or like object, they will be of special value in vulcanizing repairs of large size truck and bus tires where extreme difficulty has been experienced in the past in effecting a thorough vulcanization of the repair due to the thickness of the tire section to be repaired.

Most of the vulcanizing methods in use for vulcanizing repairs in tire casings apply heat from either the inside or outside of the tire and in such methods it is practically impossible to apply sufficient heat to vulcanize the repair thoroughly without burning, scorching, overcuring or otherwise injuring the part of the tire nearest the source of heat. For this reason, many authorities on tire repairing endorse and use a method of vulcanizing whereby the repair is first cured on the outside and then on the inside or vice versa, with the result of a large expenditure in equipment and labor.

Another method of vulcanizing tire repairs has been to place the tire in a heated mold with an expansible bag, usually made of rubber, within the tire and then to circulate steam through the expansible bag, the steam supplying the heat to the inside of the tire and also the pressure necessary to press the tire against the heated mold. One of the difficulties of this method is that the steam of the proper temperature will not exert a sufficient pressure to properly weld the repair together. Moreover, the expansible bag, in order to provide sufficient expansibility, is usually made of rubber with fabric reinforcement; and because of the combination of heat and pressure to which the bag is subjected, the bag is extremely short lived, seldom giving more than eighteen or twenty cures. Still another disadvantage of this method is that it is usually necessary to install a separate steam boiler for furnishing the steam to heat the bag.

It is therefore one of the objects of this invention to provide a method and apparatus for vulcanizing repairs, which eliminates the difficulties hereinbefore mentioned and wherein the heat is applied to both the inside and outside of the repair in any desired quantity. The repair may be heated on the inside for only a part of the vulcanizing operation, if desired, and pressure can be applied in any desired quantity and independent of the method of heating and not limited thereby. This invention takes into account all of the fundamental requirements of vulcanizing a tire repair, namely, the application of a predetermined temperature and sufficient pressure for a predetermined time. These requirements are governed largely by the materials used in building up the tire repair and by the thickness of the repair, and are easily predetermined, thereby eliminating guess work and poorly vulcanized repairs, now so common.

Figure 4:
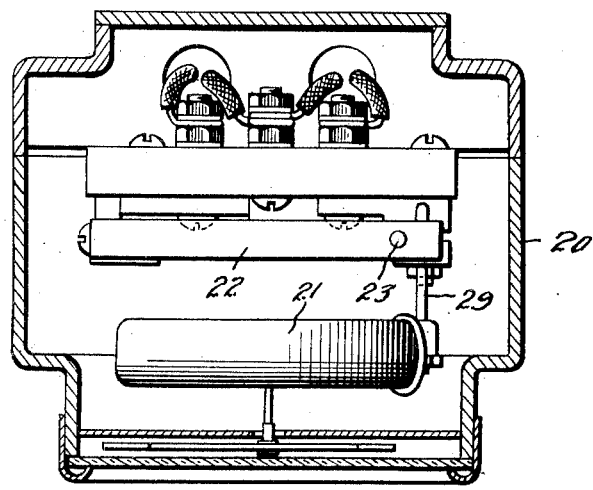

Further and more limited objects of the invention will appear as the description proceeds and by reference to the accompanying drawings in which Fig. 1 is a fragmentary view in front elevation disclosing my improved apparatus with a section of a tire secured therein; Fig. 2 is a vertical sectional view of the apparatus shown in Fig. 1; Fig. 3 is a view in rear elevation of a Bourdon tube which is used to control the flow of current to the heating elements; Fig. 4 is a horizontal sectional view of the Bourdon tube and casing in which it is arranged; Fig. 5 is a horizontal sectional view disclosing the contact or switch for breaking the circuit and the manner of adjusting the same; Fig. 6 is a vertical sectional view of the Bourdon gage arrangement within the casing and Figs. 7 and 8 are diagrammatic views showing the electrical connections.

Referring now to the drawings the reference character 1 designates a sectional mold having a U-shaped cavity therein adapted to receive a section of a tire as shown most clearly in Fig. 1. The sectional mold 1 is hollow and adapted to contain a quantity of water. The mold is preferably supported by means of legs 2 and 3 and secured to the bottom of the mold is an electrical heating unit 4 which is held in place by means of a strip 5 and consists of an electrical resistance enclosed in suitable insulation and having terminals 6 and 7 to which wires are connected leading to a source of electrical energy. The mold is provided with air vent valves, a safety device, a filling device and water level indicator (not shown) and the method of heating the mold follows generally that described in my Patent No. 1,262,598, dated April 9, 1918, except that the flow of current to the heating unit is controlled by a combination pressure gage and switch, indicated generally at 8. The cavity of the U-shaped mold 1 is adapted to receive a tread forming matrix 9, as shown in Fig. 2. When it is desired to vulcanize a repair, the repair is made in the usual manner and the tire placed within the mold as shown in Fig. 2 in such a position that the portion to be repaired is substantially enclosed within the mold, the mold having been preferably first heated to a vulcanizing temperature. A flexible heating element or pad 10 has been previously placed within the repair. This pad consists of an electrical resistance enclosed within suitable insulation and has suitable leads for connecting the same with a source of electrical energy. The heating pad is flexible and of such a size as to neatly fit within the tire. After the heating element 10 has been placed within the tire, a flexible air bag 11 is inserted within the tire. The bag 11 has a connection 12 by means of which the same may be inflated. Between the air bag and heating element, I insert a measuring bulb 14 which is adapted to contain a volatile liquid and from which leads a tube 15, as shown most clearly in Fig. 1. If preferred the bulb 14 may be placed between the heater pad and tire. Bead plates 16 and 17 are then fitted against the side wall of the tire and the mold and conform to the shape of the tire at the beads and serve to conduct heat from the mold to the beads of the tire. A clamp 18 of well known construction serves to secure the bead plates in place. The air bag 11 is then inflated to the desired pressure through the connection 12.

For the purpose of controlling the temperature within the repair, I provide a combined pressure gage and switch 19 which is identical in construction with the combined pressure gage and switch 8 hereinbefore referred to. This combined pressure gage and switch consists essentially of a casing 20 in which is arranged a Bourdon tube 21 which is connected at one end with the tube 15. Also arranged within the casing is a resilient contact element or switch 22 which carries a switch contact 23 which is normally pressed against a stationary switch contact 24, the position of which may be adjusted by means of a screw 25. This contact device constitutes a switch through which all electric current passing to the heating pad 10 must pass. The outer end of the Bourdon tube is operatively connected with a shaft 26 on which is mounted an indicating hand 27, which travels over a scale 28. It will thus be seen that as the temperature of the thermometer bulb 14 is increased, the Bourdon tube will tend to straighten and thereby actuate the pointer 27 to indicate the pressure within the repair. Connected with the Bourdon tube 21 is a bar 29 which projects beneath the resilient contact element 22. By adjusting the position of the screw 25, the stationary contact 24 may be so positioned with respect to the movable contact element 23 that the circuit will be broken when the temperature within the repair reaches a predetermined point, thereby cutting off the flow of current to the heating element 10. When the temperature within the repair drops slightly the current is again turned on. In this way, the temperature within the repair is automatically regulated and controlled so as to maintain a substantially constant temperature therewithin.

The heating element 4 is also connected in series with a source of electrical energy and is automatically controlled by means of the combined pressure gage and switch 8 which is identical in construction with the combined pressure gage and switch 19 except that the pressure gage 8 is actuated directly by the steam pressure within the mold. A tube 8' serves to connect the interior of the mold with the Bourdon tube within the gage 8. When the pressure within the mold reaches a predetermined point the combined pressure gage and switch 8 is actuated to cut off the flow of current to the heating unit 4.

It will thus be seen that the temperature both on the inside and outside of the repair is automatically controlled and maintained substantially constant for the entire vulcanizing operation. The opening and closing of the contacts 22 and 24 is repeated when slight variations in the steam pressure occur, in this way maintaining substantially uniform pressure. By adjusting the position of the stationary contact 25, this pressure may be adjusted as desired. The heating units 4 and 10 are entirely separate and independent of each other and in some cases it may be desirable to apply heat to the heating unit 10 for only a portion of the vulcanizing operation. In other words, either of the heating units 4 or 10 may be disconnected when desired.

It will now be clear that I have provided a method and apparatus of vulcanizing repairs in pneumatic tires which will accomplish the objects of the invention as hereinbefore stated. It will also be seen that my apparatus provides means for applying heat to both the inside and outside of a tire and for providing a continuous and sufficient pressure necessary to insure vulcanization and a welding together of the various parts of repair.

Various changes may be made in the method of operation as well as in the details of my construction without departing from the spirit of the invention. For example, the flexible air bag may be replaced by a bag having the bulb containing the volatile liquid incorporated into and made a part of the bag. Likewise, it may be advisable to construct the heating unit and air bag in a single unit with the bulb containing the volatile liquid incorporated therein. It therefore should be understood that my invention is limited only in accordance with the scope of the appended claims.

Having thus described my invention, what I claim is:

1. In an apparatus for vulcanizing repairs in tires, the combination of a mold adapted to substantially surround the repair, means for heating said mold to a vulcanizing temperature, an electrical heating element adapted to be disposed within the repair, means for subjecting the interior of the repair to a vulcanizing pressure, an electrical circuit for said electrical heating element including a switch and a pressure actuated device located outside of the repair and connected with the interior of the repair and associated with said switch so as to break the circuit to said electrical heating element when the temperature within the repair reaches a predetermined point.

2. In an apparatus for vulcanizing repairs in pneumatic tires, the combination of an electric heating pad of such shape as to cooperate with the part of the tire to be vulcanized, a bulb containing an expansible material sensitive to temperature changes and arranged within the repair so as to be acted upon by said heating pad, a pressure responsive circuit breaker located outside of the repair and connected with said bulb and arranged to open and close the electric circuit to said electric heating pad as variations in temperature occur, thereby maintaining the temperature of the electric heating pad substantially constant.

3. In an apparatus for vulcanizing repairs in pneumatic tires, the combination of an electric heating pad of such shape as to fit within the part of the tire to be vulcanized; a bulb containing a volatile liquid and arranged within the repair so as to be acted upon by said electric heating pad; a pressure indicating device operatively connected with said bulb in such a manner as to indicate the temperature conditions adjacent said electric heater pad and including an electric switch connected in circuit with said heating pad so as to automatically regulate the flow of current through the heater circuit and to thereby maintain the temperature of the heating pad substantially constant, said electric switch being positioned so as to be unaffected by said heating pad.

4. In an apparatus for vulcanizing repairs and including a mold adapted to receive a portion of the tire therein and means for applying heat to the outside of the tire and an inflatable bag adapted to fit within the repair and to serve as a means for subjecting the repair to a vulcanizing pressure, the combination of a flexible electric heating pad fitting within the repair between the inflatable bag and the inner wall of the tire and a pressure actuated temperature indicator and control device positioned outside of the repair and operatively connected with the space between the inflatable bag and the inner wall of the tire and responsive to temperature changes within the repair so as to control the flow of current to said flexible heating pad.

5. In an apparatus for vulcanizing repairs and including a mold adapted to receive a portion of the tire therein and means for applying heat to the outside of the tire and an inflatable bag adapted to fit within the repair and to serve as a means for subjecting the repair to a vulcanizing pressure, the combination of a flexible electric heating pad fitting within the repair between the inflatable bag and the inner wall of the tire and a pressure actuated temperature indicator and control device positioned outside of the repair and operatively connected with the space between the inflatable bag and the inner wall of the tire and responsive to temperature changes within the repair, said temperature indicator and control device consisting of a Bourdon tube and a circuit breaker connected so as to break the circuit to said heating pad and a receptacle arranged within the repair and containing an expansible fluid sensitive to temperature changes and means operatively connecting said receptacle with said Bourdon tube.

6. In an electrically heated apparatus for vulcanizing repairs in pneumatic tires, a pressure actuated temperature control device for controlling the temperature within the repair and comprising a receptacle arranged within the repair and containing an expansible fluid which is sensitive to temperature changes, said device including a pressure actuated device located outside of the repair and connected with said receptacle so as to be actuated by the expansion of the fluid therein and a circuit breaker connected in electrical circuit with the electrically heated apparatus and operatively connected with said pressure actuated device so as to be opened and closed thereby to open and close the circuit in accordance with temperature variations within the repair.

7. In an apparatus for vulcanizing repairs in pneumatic rubber tires, the combination of a mold adapted to receive a portion of a tire therein, an electric heating pad of such shape as to fit within the part of the tire to be vulcanized, an inflatable bag also adapted to fit within the part of the tire to be vulcanized and serving as a means for subjecting the interior of the repair to a vulcanizing pressure, a receptable containing a volatile fluid and arranged within the repair between said bag and the inner wall of the tire, a pressure responsive device operatively connected with said receptacle in such a manner as to indicate and control the temperature within the repair and including a circuit breaker connected in circuit with said heating pad so as to automatically regulate the flow of current through the pad and to maintain the temperature of the pad substantially constant, means for subjecting the exterior of the repair to a vulcanizing temperature, said means including an electrical heating element and a chamber adapted to contain a liquid, a pressure responsive regulating and indicating device operatively connected with said chamber and including a circuit breaker connected in circuit with said last mentioned heating element and operatively connected with said pressure responsive device so as to automatically regulate the temperature within said chamber.

8. In an apparatus for vulcanizing repairs in pneumatic tires including a mold adapted to receive a portion of the tire therein and means for applying heat to the outside of the tire and an inflatable bag adapted to fit within the repair and to serve as a means for subjecting the repair to a vulcanizing pressure, a flexible electric heating pad fitting within the repair, and a pressure actuated temperature control device positioned outside of the repair and operatively connected with the interior of the repair and responsive to temperature changes within the repair, said device including a pressure actuated circuit breaker connected so as to break the circuit to the heating pad and a receptacle arranged within the repair and containing an expansible fluid sensitive to the temperature changes and means operatively connecting said receptacle with said circuit breaker.

9. In an apparatus for vulcanizing repairs in pneumatic tires, the combination of a mold adapted to receive a portion of a tire therein, an electric heating pad of such shape as to fit within the part of the tire to be repaired, an inflatable bag also adapted to fit within the part of the tire to be repaired and serving as a means for subjecting the interior of the repair to a vulcanizing pressure, a receptacle arranged within the repair and containing a volatile fluid, a pressure responsive device operatively connected to said receptacle in such a manner as to control the temperature within the repair and including a circuit breaker connected in circuit with the heating pad so as to automatically control the flow of current through the heating pad and to maintain the temperature within the repair substantially constant, means for subjecting the exterior of the repair to vulcanizing temperature, said means including an electrical heating element and a chamber adapted to contain a liquid, a pressure responsive regulating device operatively connected in circuit with said last mentioned heating element and said pressure responsive device so as to automatically regulate the temperature within said chamber.

In testimony whereof, I hereunto affix my signature.

JAMES C. HEINTZ.